United States Patent
Yamada

(10) Patent No.: US 7,416,199 B2
(45) Date of Patent: Aug. 26, 2008

(54) STEERING DEVICE FOR MOTOR VEHICLE

(75) Inventor: Yasuhisa Yamada, Gunma-ken (JP)

(73) Assignees: NSK Ltd., Tokyo (JP); NSK Steering Systems Co., Ltd., Tokyo (JP)

(*) Notice: Subject to any disclaimer, the term of this patent is extended or adjusted under 35 U.S.C. 154(b) by 386 days.

(21) Appl. No.: 10/544,808

(22) PCT Filed: Feb. 5, 2004

(86) PCT No.: PCT/JP2004/001206

§ 371 (c)(1),
(2), (4) Date: Aug. 8, 2005

(87) PCT Pub. No.: WO2004/069630

PCT Pub. Date: Aug. 19, 2004

(65) Prior Publication Data

US 2006/0162989 A1    Jul. 27, 2006

(30) Foreign Application Priority Data

Feb. 6, 2003    (JP)    ............... 2003-029891

(51) Int. Cl.
B62D 7/16    (2006.01)
B62D 5/30    (2006.01)

(52) U.S. Cl. ............... 280/93.502; 280/93.51; 74/492; 74/552; 464/162

(58) Field of Classification Search ............ 280/93.502, 280/93.51; 74/492, 552; 464/162
See application file for complete search history.

(56) References Cited

U.S. PATENT DOCUMENTS

| 2,607,257 | A | 8/1952 | Hadden |
| 3,169,407 | A | 2/1965 | Newell |
| 3,356,424 | A | 12/1967 | Edwards |
| 3,392,599 | A | 7/1968 | White et al. |
| 3,444,753 | A | 5/1969 | Runkle |
| 3,604,285 | A | 9/1971 | Erland et al. |
| 3,879,093 | A | 4/1975 | Betrix |
| 4,012,925 | A | 3/1977 | Krude |
| 4,280,341 | A | 7/1981 | Krude |
| 4,357,137 | A | 11/1982 | Brown |
| 4,384,861 | A | 5/1983 | Lange et al. |
| 4,500,141 | A | 2/1985 | Daugherty |
| 4,509,386 | A | 4/1985 | Kimberlin |
| 4,667,530 | A | 5/1987 | Mettler et al. |

(Continued)

FOREIGN PATENT DOCUMENTS

AU    234387    12/1959

(Continued)

Primary Examiner—Lesley D. Morris
Assistant Examiner—Marlon Arce-Diaz
(74) Attorney, Agent, or Firm—Miles & Stockbridge P.C.

(57) ABSTRACT

There is disclosed a steering apparatus for a vehicle in which a steering power of a steering shaft is assisted by a column-assist type electric power steering apparatus so that the steering power is transmitted to steer the wheels by means of a steering mechanism, in which a telescopic shaft with a male shaft and a female shaft fitted to each other to be mutually unrotatable and slidable is interposed between an output shaft of said column-assist type electric power steering apparatus and an input shaft of the steering mechanism.

12 Claims, 12 Drawing Sheets

U.S. PATENT DOCUMENTS

| | | | |
|---|---|---|---|
| 4,705,491 A | 11/1987 | Andersson | |
| 5,184,978 A | 2/1993 | Fillmore et al. | |
| 5,226,853 A | 7/1993 | Courgeon | |
| 5,235,734 A | 8/1993 | DuRocher | |
| 5,460,574 A | 10/1995 | Hobaugh | |
| 5,542,343 A | 8/1996 | Martin | |
| 5,709,605 A | 1/1998 | Riefe et al. | |
| 5,899,811 A | 5/1999 | Kishibuchi et al. | |
| 6,035,740 A * | 3/2000 | Budaker et al. | 74/493 |
| 6,174,239 B1 | 1/2001 | Guimbretiere | |
| 6,279,953 B1 * | 8/2001 | Cartwright | 280/779 |
| 6,293,872 B1 | 9/2001 | Ganser | |
| 6,343,993 B1 * | 2/2002 | Duval et al. | 464/167 |
| 6,364,778 B1 | 4/2002 | Beitzel et al. | |
| 6,474,868 B2 | 11/2002 | Geyer et al. | 384/49 |
| 6,510,756 B2 * | 1/2003 | Aota | 74/492 |
| 6,533,459 B2 | 3/2003 | Podhajecki et al. | |
| 6,557,433 B1 * | 5/2003 | Castellon | 74/492 |
| 6,620,050 B2 | 9/2003 | Park | |
| 6,729,648 B2 | 5/2004 | Ulintz | |
| 6,733,039 B2 | 5/2004 | Honda et al. | |
| 6,755,746 B2 | 6/2004 | Barnley et al. | |
| 6,761,503 B2 | 7/2004 | Breese | |
| 6,893,353 B2 | 5/2005 | Dutkiewicz et al. | |
| 6,902,487 B2 | 6/2005 | Welschof | |
| 6,921,338 B2 | 7/2005 | Cermak et al. | |
| 6,948,401 B2 | 9/2005 | Zernickel et al. | |
| 7,147,375 B2 | 12/2006 | Zernickel et al. | |
| 7,226,360 B2 | 6/2007 | Lyon et al. | |
| 2001/0006564 A1 | 7/2001 | Geyer et al. | |
| 2002/0177485 A1 | 11/2002 | Cermack et al. | |
| 2003/0073503 A1 | 4/2003 | Perrow | |
| 2004/0245759 A1 | 12/2004 | Yamada et al. | |
| 2005/0022623 A1 | 2/2005 | Reiche et al. | |
| 2005/0070365 A1 | 3/2005 | Riefe et al. | |
| 2005/0104354 A1 | 5/2005 | Yamada et al. | |
| 2005/0257639 A1 | 11/2005 | Yamada | |
| 2006/0012161 A1 | 1/2006 | Yamada | |
| 2006/0039747 A1 | 2/2006 | Shoda et al. | |
| 2006/0053934 A1 | 3/2006 | Bahr et al. | |
| 2006/0060022 A1 | 3/2006 | Yamada | |
| 2006/0068924 A1 | 3/2006 | Yamada | |
| 2006/0082120 A1 | 4/2006 | Taniguchi et al. | |
| 2006/0156855 A1 | 7/2006 | Yukawa et al. | |
| 2006/0162989 A1 | 7/2006 | Yamada | |
| 2006/0181069 A1 | 8/2006 | Yamada | |
| 2006/0252559 A1 | 11/2006 | Yamada | |
| 2007/0157754 A1 | 7/2007 | Yamada | |
| 2007/0273137 A1 | 11/2007 | Yamada et al. | |

FOREIGN PATENT DOCUMENTS

| | | |
|---|---|---|
| DE | 37 30 393 | 3/1989 |
| DE | 37 30 393 A1 | 3/1989 |
| DE | 19538303 | 4/1997 |
| DE | 19820291 | 11/1999 |
| DE | 198 24 477 | 12/1999 |
| DE | 19905350 | 8/2000 |
| DE | 102 02 899 | 8/2002 |
| DE | 20212294 | 10/2003 |
| EP | 0281723 | 9/1988 |
| EP | 1 065 397 | 1/2001 |
| EP | 1 078 843 | 2/2001 |
| EP | 1106851 | 6/2001 |
| EP | 1 167 790 | 1/2002 |
| EP | 1 247 719 A | 10/2002 |
| EP | 1512607 | 3/2005 |
| EP | 1547903 | 6/2005 |
| EP | 1557338 | 7/2005 |
| EP | 1568569 | 8/2005 |
| EP | 1588921 | 10/2005 |
| ES | 2 161 127 | 11/2001 |
| FR | 2 795 787 A1 | 1/2001 |
| GB | 2 344 084 | 5/2000 |
| GB | 2 344 084 A | 5/2000 |
| GB | 2362688 | 11/2001 |
| GB | 2 373 551 | 9/2002 |
| JP | 45-19207 | 8/1970 |
| JP | 62-244758 | 10/1987 |
| JP | UM 1-145670 | 10/1989 |
| JP | UM-4-43522 | 4/1992 |
| JP | 29-16708 | 6/1992 |
| JP | UM 4-123775 | 11/1992 |
| JP | 2000-38142 | 2/2000 |
| JP | 2000-159042 | 6/2000 |
| JP | 2000-205288 | 7/2000 |
| JP | 2000-337395 | 12/2000 |
| JP | 2001-50293 | 2/2001 |
| JP | 2001-193738 | 7/2001 |
| JP | 2001-239944 | 9/2001 |
| JP | 2002-46633 | 2/2002 |
| JP | 2002-286034 | 10/2002 |
| JP | 2002-539033 | 11/2002 |
| SU | 398786 | 9/1973 |
| WO | WO 86/07120 | 12/1986 |
| WO | WO 99/08920 | 2/1999 |
| WO | WO 00/55028 | 9/2000 |
| WO | WO 2004/033270 | 4/2004 |

* cited by examiner

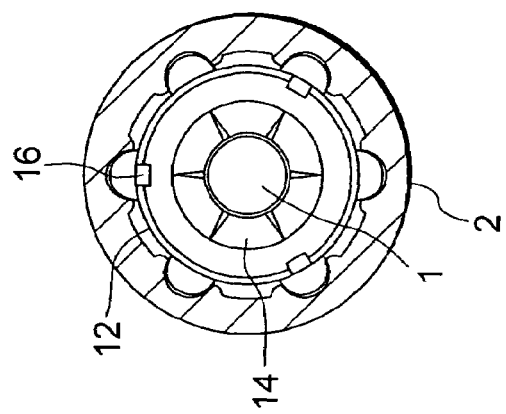
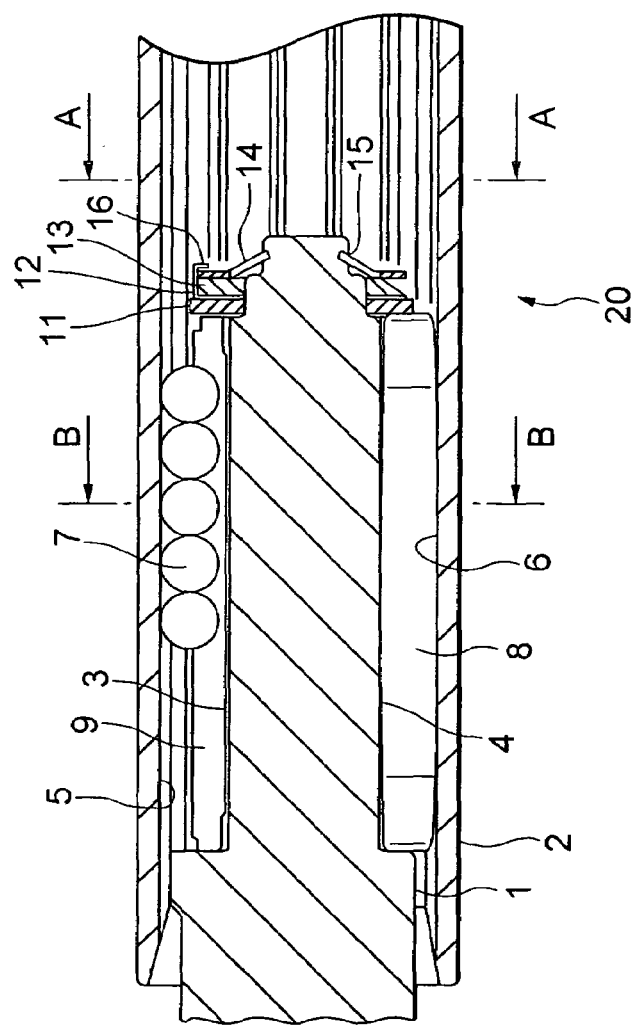

STEERING DEVICE FOR MOTOR VEHICLE

TECHNICAL FIELD

The present invention relates to a steering apparatus for a vehicle in which a steering power of a steering shaft is assisted by a column-assist type electric power steering apparatus so that the steering power having increased torque is transmitted through a telescopic intermediate shaft to steer the wheels by means of a steering mechanism in its turn.

BACKGROUND ART

In Japanese Utility Model Application Laid-Open No. 1-145670, an intermediate shaft is interposed between an output shaft of a column-assist type electric power steering apparatus and a pinion shaft of a steering gear. This intermediate shaft is provided with a damper for damping a reaction force from a road surface. This intermediate shaft, however, is not extended and/or contracted in the axial direction.

FIGS. 9 to 12 show a steering apparatus for a vehicle according to a prior art. According to the prior art, an intermediate shaft which is collapsible at a secondary collision is interposed between an output shaft of a column-assist type electric power steering apparatus and a pinion shaft of a steering gear.

That is, FIG. 9 is a schematic view of the steering apparatus for a vehicle according to the prior art. In FIG. 9, a steering column 50 is rotatably supported by a steering shaft 51, and a steering wheel 52 is provided in an upper part of the steering shaft 51.

The steering column 50 is provided with a column-assist type electric power steering apparatus 53, and this electric power steering apparatus 53 is provided with an electric motor 54 for assist, a gear unit 55 serving as a reduction gear, an output shaft 56 for outputting a steering power assisted by the electric motor 54 with high torque, and so on.

The steering column 50 is also provided with a tilt mechanism 57. When an operation lever 58 is operated, the steering column 50 can be tilted around a tilt center C with respect to a bracket 59 which is fixed to the vehicle body side.

An intermediate shaft 64 is interposed between the output shaft 56 of the electric power steering apparatus 53 and a pinion shaft 61 of a steering gear unit 60 of a rack and pinion type through universal joints 62 and 63 on the upper and lower sides. This intermediate shaft 64 is composed of a female spline (or serration) shaft 65 on the upper side and a male spline (or serration) shaft 66 on the lower side which is press-fitted in this female spline shaft 65.

A male serration unit 67 is formed on the male spline shaft 66 on the front side of the vehicle, and this male serration unit 67 is fitted in a yoke 63a of the lower-side universal joint 63 and is clamped by a clamping bolt 68.

FIG. 10 is a schematic view of the steering apparatus for a vehicle according to the prior art, for showing the highest level and the lowest level of a tilt operation (a view for explaining various axial displacements).

In the steering gear unit 60, a vibration is produced from the vehicle body (on gear side) while the vehicle is running.

At assembling into the vehicle, the yoke 63a of the lower-side universal joint 63 is slid with respect to the male serration unit 67, and then the yoke 63b of the lower-side universal joint 63 is fitted to the pinion shaft 61, thereby clamping the clamping bolts 100 and 68.

On the intermediate shaft 64, the lower-side male spline shaft 66 is press-fitted in the upper-side female spline shaft 65. The intermediate shaft 64 is collapsed at a collision, but is not slid in the axial direction at a tilt operation at which the intermediate shaft 64 is normally used. Generally, the intermediate shaft 64 is collapsed when a load of not less than 500N is applied thereon in case a collision, an accident, or the like of the vehicle occurs and a displacement is generated in the axial direction.

An axial displacement due to a movement of the upper-side universal joint caused by tilt adjustment is generated between the upper-side universal joint 62 and the lower-side universal joint 63. In this case, there is provided no mechanism which slides with a low load between the upper-side universal joint 62 and the lower-side universal joint 63, so that an axial load is generated between these joints.

Further, when torque is transmitted in a state that a position at which the column-assist type electric power steering apparatus 53 is installed is deviated from the designed position, a torque fluctuation becomes a little larger with respect to the designed value.

FIG. 11 is a view for explaining that an inter-joint length changes at the time of tilt adjustment.

The relation that LA<LB<LC is established when the inter-joint length (L) is LA at the tilt highest level position, LB at a tilt neutral position, and LC at the tilt lowest level position.

FIG. 12 is a partially cut-away cross sectional view of the intermediate shaft according to the prior art. This intermediate shaft 64 is composed of a female spline (serration) shaft 65 on the upper side and a male spline (serration) shaft 66 on the lower side which is press-fitted in the female spline shaft 65.

The female spline shaft 65 works also as a yoke of the upper-side universal joint 62. A male serration unit 67 is formed on the male spline shaft 66 on the vehicle front side, and this male serration unit 67 is fitted in a yoke 63a of the lower-side universal joint 63 and is clamped by a clamping bolt 68.

The column-assist type electric power steering apparatus is provided with the following function. That is, when the driver performs steering through the steering wheel 52, a steering torque thereof is detected to be calculated by CPU, and the electric motor 54 is driven on the basis of a result of the calculation. An output shaft of the electric motor 54 and a steering shaft are engaged with the gear unit 55 of a worm and wheel type, and the steering power is assisted by the power of the electric motor 54.

The intermediate shaft attached to the column-assist type electric power steering apparatus has the following functions.

The intermediate shaft is required to have the structure which can endure high torque transmission since it transmits high torque constantly.

There should be generated no backlash in the direction of rotation since it controls the assist of the steering torque.

The intermediate shaft has a collapsing mechanism for absorbing displacement from the front part of the vehicle at a vehicle collision in order to protect the driver.

As described above, the above functions are given to the intermediate shaft according to the prior art. However, in terms of the steering stability, the assembling performance and the cost, these functions are not always sufficient.

In order to satisfy the above items, such a function is required which can extend and contract the intermediate shaft with a low stable sliding load so that the intermediate shaft can be moved easily with a hand and can transmit high torque without backlash.

The followings are reasons for requiring this expanding/contracting function.

At steering, a low stable steering shaft rotating torque property which is not affected by a deviated position of installation in the vehicle is to be obtained.

At running of the vehicle, the intermediate shaft is to absorb a vibration and a displacement from the steering gear side so as to make it difficult to transmit unpleasant vibration or sound onto the steering wheel.

At tilt adjustment, the intermediate shaft is to easily absorb an axial displacement when the steering wheel is tilted in an up-and-down direction and the length of the intermediate shaft is changed so as to prevent an extra axial load or moment from being applied on the whole steering shaft.

At assembling, the intermediate shaft is to be extended and contracted freely so as to be easily assembled in the vehicle, whereby one clamping position in the clamping work of the clamping bolt can be omitted.

In European Patent Application Laid-Open No. EP1078843A1, a member for preventing backlash in the direction of rotation, which is required for a steering shaft, takes a retainer-like shape of plastic. Therefore, small gaps between the male shaft, the female shaft and the needle rollers are adjusted by such plastic members.

However, plastic products are not satisfactorily abrasion-proof and it is difficult to maintain the performance of such products without backlash for a long term use. For this reason, when abrasion is produced, there arises a problem that the backlash is generated on the steering shaft. Since the structure is also required to allow relative movement in the axial direction so that the male shaft and the female shaft are moved relatively to each other, it is required to provide a gap in a sliding portion so that backlash can not be structurally prevented completely.

In FIGS. 1 to 5 of German Patent No. DE3730393C2, in order to apply preload, there is required a structure in which leaf springs provided in different grooves are connected to-each other. In other cases, there is required a structure in which elastic members are laid under leaf springs so as to generate preload in the radial direction.

In these structures, since leaf springs having different curvatures are provided in grooves of the male shaft and the female shaft having the curvatures, it is very difficult to obtain a large amount of flexure of the leaf springs. As a result, it is very difficult to provide the leaf springs with a flexural amount which can allow fluctuations in the processing precision of the male shaft and the female shaft.

When torque is inputted, the male shaft, the leaf springs, balls and the female shaft are mutually contracted to transmit the torque, so that the points contacting with the balls have very high surface pressure, and the steering shaft can highly possibly not satisfy the required torque transmitting performance and the life as that used for a vehicle (particularly when the shaft is combined with the column-assist type electric power steering which is required to transmit high torque).

Since an outer leaf spring tends to slide sideways with respect to the female shaft at the time of torque transmission and hysteresis is easily generated, a structural problem that the magnitude of this hysteresis can not be controlled.

However, in the prior art described above, even if taking Japanese Utility Model Application Laid-Open No. 1-145670, the prior art illustrated in FIGS. 9 to 12, European Patent-Application Laid-Open No. EP1078843A1 described above, and German Patent No. DE3730393C2 described above into consideration, there is provided no telescopic shaft which has such a performance as can be combined with the column-assist type electric power steering apparatus. As a result, it is difficult to obtain a steering system having such an excellent performance as to satisfy the items described above.

Under such circumstances, it is expected that a total steering system in which a telescopic intermediate shaft with a high performance to satisfy the above-described requirements is combined with the column-assist type electric power steering apparatus is to be developed.

The present invention has been contrived taking the above circumstances into consideration, and an object thereof is to provide a steering apparatus for a vehicle which can transmit high torque without backlash when being provided with a column-assist type electric power steering apparatus and which can extend and contract an intermediate shaft with such a low stable sliding load as can move the intermediate shaft easily with a hand.

In order to achieve the above object, according to the present invention, there is provided a steering apparatus for a vehicle in which a steering power of a steering shaft is assisted by a column-assist type electric power steering apparatus so that the steering power having increased torque is transmitted to steer the wheels by means of a steering mechanism in its turn, characterized in that:

a telescopic shaft with a male shaft and a female shaft fitted to each other to be mutually unrotatable and slidable is interposed between an output shaft of the column-assist type electric power steering apparatus and an input shaft of the steering mechanism.

As described above, according to the present invention, since the telescopic shaft with the male shaft and the female shaft fitted to be mutually unrotatable and slidable is interposed between the output shaft of the column-assist type electric power steering apparatus and the input shaft of the steering mechanism, it is possible to realize a stable sliding load and to prevent backlash without fail, thereby transmit torque in a state of high rigidity.

With this arrangement, the following items which are required when the intermediate shaft is combined with the column-assist type electric power steering apparatus as described above can be fully satisfied.

At steering, a low stable steering shaft rotating torque property which is not affected by a deviated position of installation in the vehicle is to be obtained.

At running of the vehicle, the intermediate shaft is to absorb a vibration and a displacement from the steering gear side so as to make it difficult to transmit unpleasant vibration or sound onto the steering wheel.

At tilt adjustment, the intermediate shaft is to easily absorb an axial displacement when the steering wheel is tilted in an up-and-down direction and the length of the intermediate shaft is changed so as to prevent an extra axial load or moment from being applied on the whole steering shaft.

At assembling, the intermediate shaft is to be extended and contracted freely so as to be easily assembled in the vehicle, whereby one clamping position in the clamping work of the clamping bolt can be omitted.

The intermediate shaft is required to have the structure which can endure high torque transmission since it transmits high torque constantly.

Since no backlash is generated in the direction of rotation, the assist of the steering torque can be controlled more correctly.

The intermediate shaft has a collapsing mechanism for absorbing a displacement from the front part of the vehicle at a vehicle collision in order to protect the driver.

The intermediate shaft is extended and contracted easily at tilt and telescopic operations so that it is possible to obtain an optimal position for the driver and to obtain a stable steering property.

BRIEF DESCRIPTION OF THE DRAWINGS

FIG. 4A is a cross sectional view of the telescopic shaft shown in FIG. 3 in an enlarged manner, and FIG. 4B is a transverse cross sectional view taken along the line A-A in FIG. 4A;

EMBODIMENT OF THE INVENTION

A steering apparatus for a vehicle according to each embodiment of the present invention will be described below with reference to the drawings.

First Embodiment

Figure 1:
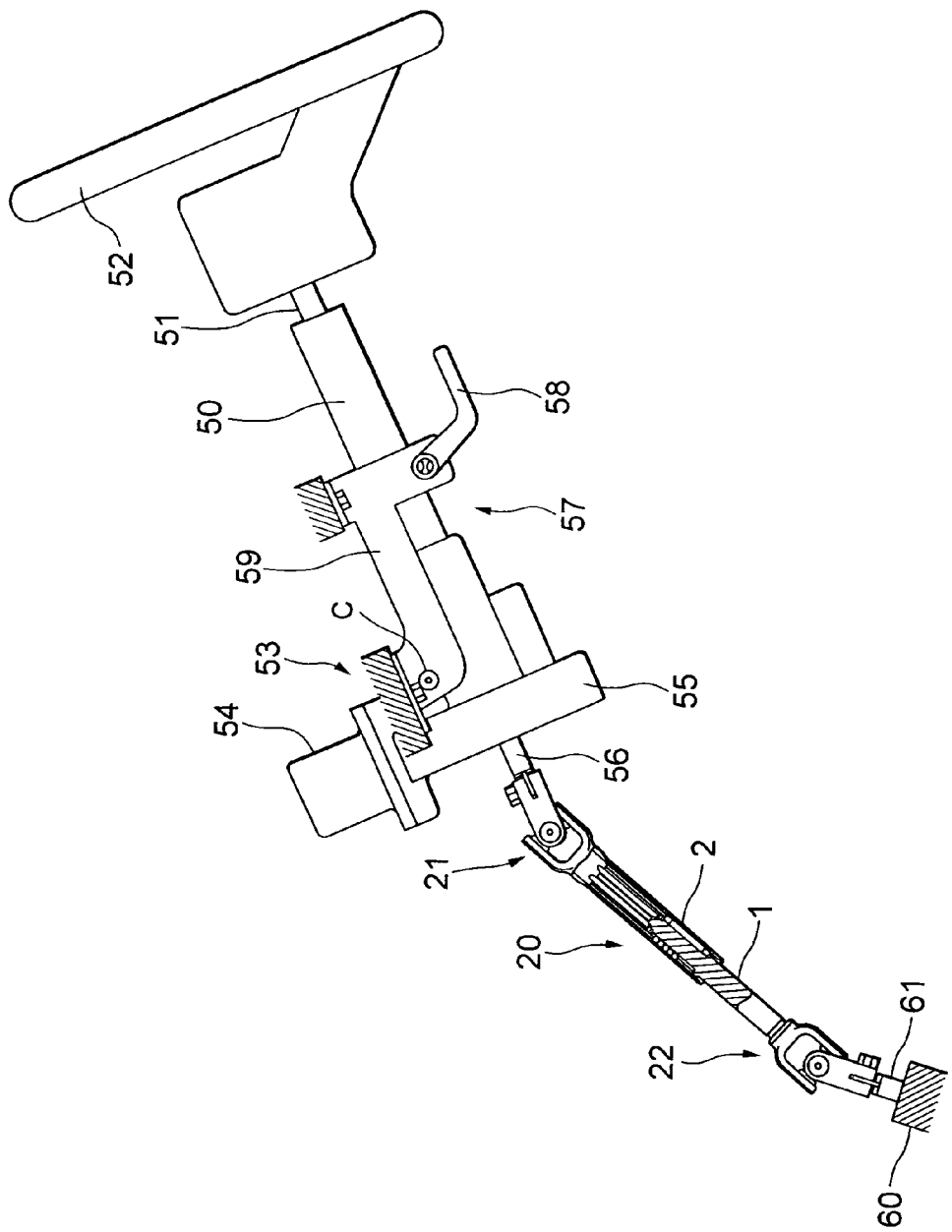
FIG. 1 is a schematic view of a steering apparatus for a vehicle according to a first embodiment of the present invention.
Figure 2:
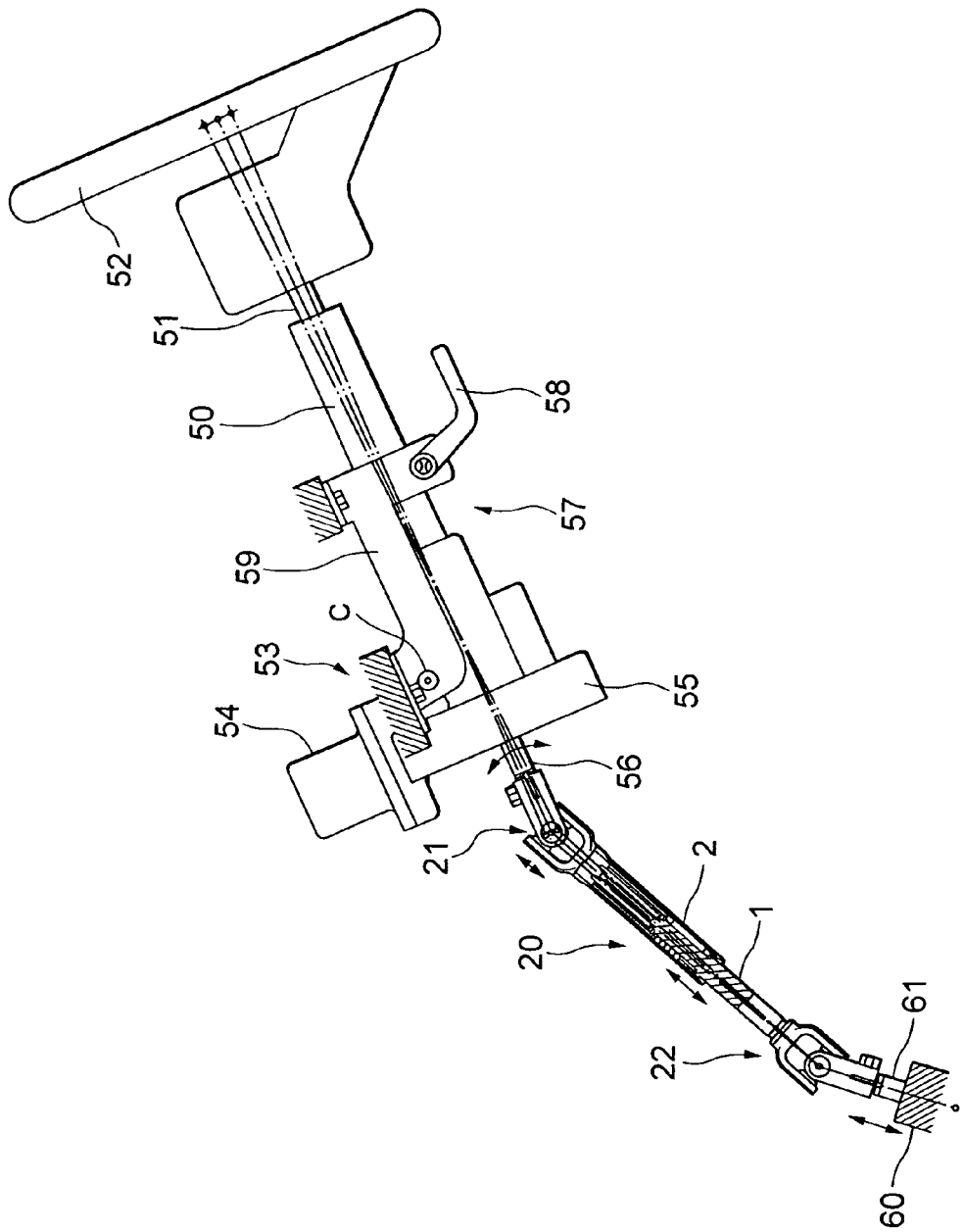
FIG. 2 is a schematic view of the steering apparatus for a vehicle shown in FIG. 1, for showing the highest level and the lowest level of tilting (a view for explaining various axial displacements)

FIG. 1 is a schematic view of a steering apparatus for a vehicle according to the first embodiment of the present invention, and FIG. 2 is a schematic view of the steering apparatus for a vehicle shown in FIG. 1, for showing the highest level and the lowest level of tilting and for explaining various axial displacements.

A steering shaft 51 is rotatably supported by a steering column 50, and a steering wheel 52 is provided in an upper part of the steering shaft 51.

The steering column 50 is provided with a column-assist type electric power steering apparatus 53, and this electric power steering apparatus 53 is provided with an electric motor 54 for assist, a gear unit 55 serving as a reduction gear, an output shaft 56 for outputting a steering power assisted by the electric motor 54 with high torque, and so on.

The steering column 50 is also provided with a tilt mechanism 57. When an operation lever 58 is operated, the steering column 50 can be tilt-adjusted around a tilt center C with respect to a bracket 59 which is fixed to the vehicle body side.

A telescopic intermediate shaft 20 is interposed between an output shaft 56 of the electric power steering apparatus 53 and a pinion shaft 61 of a steering gear unit 60 of a rack and pinion type through universal joints 21 and 22 on the upper and lower sides.

Figure 3:
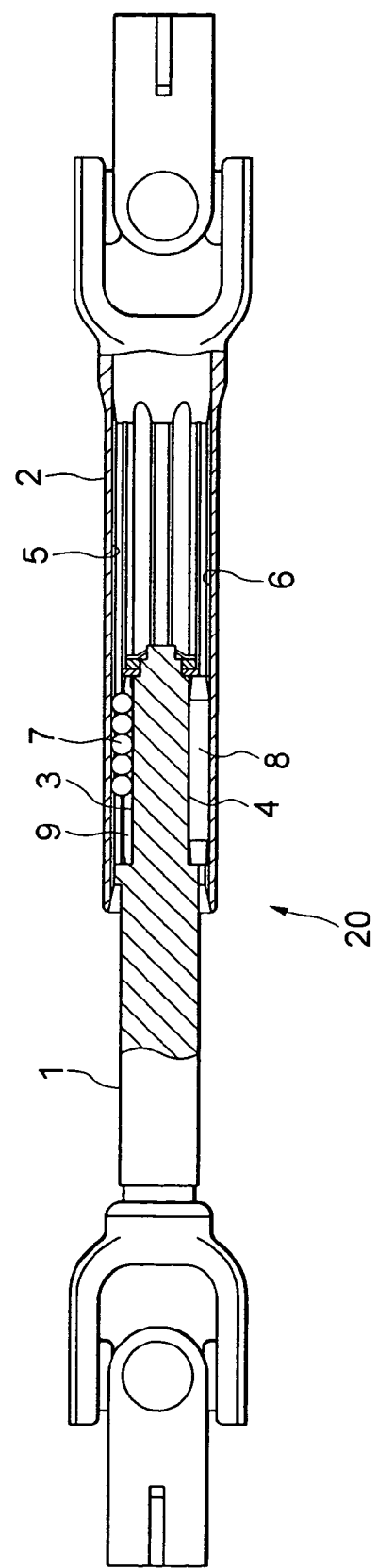
FIG. 3 is a longitudinal cross sectional view of a telescopic shaft which is attached to the steering apparatus for a vehicle according to the first embodiment of the present invention.
Figure 5:
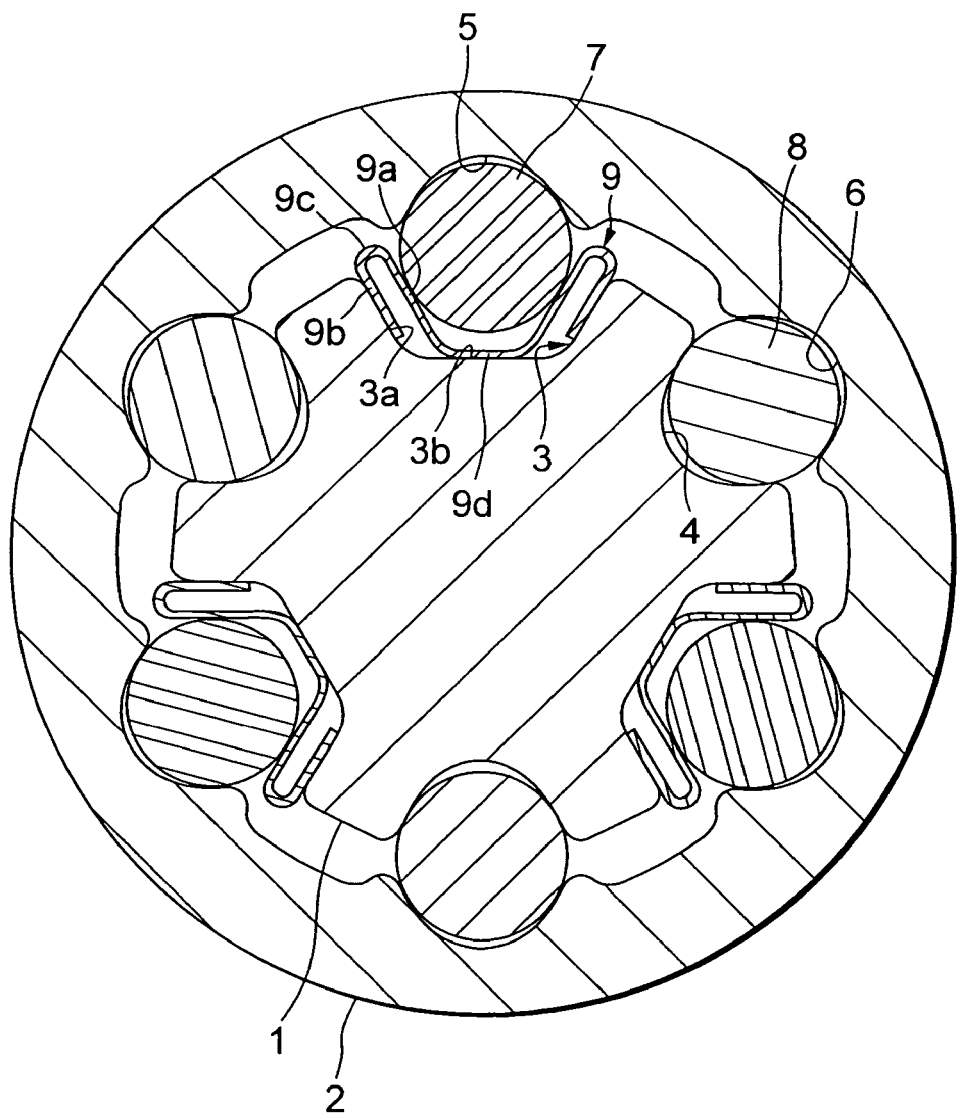
FIG. 5 is a transverse cross sectional view taken along the line B-B in FIG. 4A, in an enlarged manner.

FIG. 3 is a longitudinal cross sectional view of the telescopic intermediate shaft 20 attached to the steering apparatus for a vehicle according to the first embodiment of the present invention. FIG. 4A is an enlarged cross sectional view of the telescopic shaft shown in FIG. 3, and FIG. 4B is a transverse cross sectional view taken along the line A-A in FIG. 4A. FIG. 5 is an enlarged cross sectional view taken along the line B-B in FIG. 4A.

As shown in FIG. 3 and FIGS. 4A and 4B, the telescopic shaft 20 is composed of a male shaft 1 and a female shaft 2 which are fitted to each other to be mutually unrotatable and slidable.

As shown in FIG. 5, three axial grooves 3 are extended on the outer peripheral surface of the male shaft 1 at regular intervals of 120° in the circumferential direction. To be corresponding thereto, also on the inner peripheral surface of the female shaft 2, there are provided three axial grooves 5 which are extended at regular intervals of 120° in the circumferential direction.

Between the axial grooves 3 of the male shaft 1 and the axial grooves 5 of the female shaft 2, a plurality of spherical members 7 (rolling members or balls) which are rigid bodies for rotating upon a relative movement of the male and female shafts 1 and 2 in the axial direction are interposed to be rotatable.

Each of the axial grooves 5 of the female shaft 2 has substantially an arch-shaped or Gothic arch-shaped cross section. Each of the axial grooves 3 of the male shaft 1 is constituted by a pair of inclined flat-shaped side surfaces 3a and a bottom surface 3b which is formed to be flat between these paired flat-shaped side surfaces 3a.

Between the axial groove 3 of the male shaft 1 and the spherical member 7, a leaf spring 9 is interposed to be in contact with the spherical member 7 and apply preload thereto.

This leaf spring 9 has a unitary structure comprising contact portions 9a on the spherical member side to be in contact with the spherical member 7 at two points, contact portions 9b on the groove surface side which are separated from the contact portions 9a on the spherical member side by predetermined distances substantially in the circumferential direction and which are at the same time in contact with the flat-shaped side surfaces 3a of the axial groove 3 of the male shaft 1, biasing portion 9c each for elastically biasing the contact portion 9a on the spherical member side and the contact portion 9b on the groove surface side in a direction that both the contact portions 9a and 9b are separated from each other, and a bottom portion 9d which is opposed to the bottom surface 3b of the axial groove 3.

The biasing portion 9c is in a folded form which is folded to be substantially U-shaped with the substantially arch-shaped bottom portion. The contact portion 9a on the spherical member side and the contact portion 9b on the groove surface side can be elastically biased by the folded-shaped biasing portion 9c to be separated from each other.

As shown in FIG. 5, three axial grooves 4 are provided to be extended on the outer peripheral surface of the male shaft 1 at regular intervals of 120° in the circumferential direction.

Each of the axial grooves 4 is formed substantially at a middle position between each adjacent axial grooves 3 in the circumferential direction. To be corresponding thereto, also on the inner peripheral surface of the female shaft 2, there are provided to be extended three axial grooves 6 at regular intervals of 120° in the circumferential direction.

Between the axial grooves 4 of the male shaft 1 and the axial grooves 6 of the female shaft 2, a plurality of needle rollers 8 which are columnar members of rigid bodies for slidably moving upon a relative movement of the male shaft 1 and the female shaft 2 in the axial direction are interposed with very small gaps. Each of these axial grooves 4 and 6 has substantially an arch-shaped or Gothic arch-shaped cross section.

As shown in FIG. 4A, at an end portion of the male shaft 1, the needle roller 8, the leaf spring 9 and the ball 7 are fixed in the axial direction by a stopper plate 11, a washer holder 12, a wave washer 13 and a push nut 14.

The stopper plate 11 comprises a surface against which the needle roller 8 or the ball 7 is directly abutted. The wave washer 13 serves to appropriately preload the needle roller 8 through the stopper plate 11 in the axial direction, whereby the needle roller 8 can freely move in the axial direction to prevent abnormal sound from being generated.

The push nut 14 serves to perform fixation in the axial direction. The push nut 14 in itself can be fixed in the axial direction satisfactorily by being fitted into the shaft to be applied. However, in case of the present embodiment, in order to obtain higher fixing capability in the axial direction, it is designed such that an annular groove 15 is formed on the shaft so that the push nut 14 is to be fitted in the annular groove 15.

The push nut 14 and the wave washer 13 are formed as separate members, but are connected to each other by the washer holder 12 as a unitary structure. A pawl 16 is protruded from the washer holder 12. The pawl 16 catches the push nut 14 to hold in such a manner as to sandwich the wave washer 13 therebetween. This arrangement is made to reduce the number of the constituent parts, for the purpose of reducing the number of steps in assembling. In this respect, the pawl may be formed to be protruded from the stopper plate 11 in the same manner, so that the waver washer 13 and the push nut 14 can be formed as a unitary structure. It is possible to arrange such that the washer holder 12 described above is removed, a coned disk and a flat washer are used instead of the wave washer 13 and the push nut 14, respectively, and the outer peripheral part of the flat washer is fixed by plastically deforming by caulking(or clinching), instead of the pawl 16. In this case, the number of the constituent parts can be reduced, and the cost of the constituent parts can be decreased.

Further, a lubricating agent is applied among the axial grooves 3 and 4 of the male shaft 1, the axial grooves 5 and 6 of the female shaft 2, the leaf springs 9 and the spherical members 7, so that the male shaft and the female shaft can slide in the axial direction with a stable sliding load without backlash at the time of non-transmission of torque (at the time of sliding movement).

In other words, the telescopic shaft 20 is provided with a first torque transmitting device comprising first interposing portions (the axial grooves 3 and 5) which are formed on the outer peripheral surface of the male shaft 1 and on the inner peripheral surface of the female shaft 2, first torque transmitting members (the rolling members 7) which are formed on the first interposing portions (the axial grooves 3 and 5) and are rotated upon a relative movement in the axial direction of the male shaft 1 and the female shaft 2, and elastic members (the leaf springs 9) which are disposed in the first interposing portions (the axial grooves 3 and 5) in adjacent to the first torque transmitting members (the rolling members 7) in the radial direction so as to restrain the first torque transmitting members (the rolling members 7) at rotation and to apply preload to the male shaft 1 and the female shaft 2 through the first torque transmitting members (the rolling members 7) at non-rotation, and a second torque transmitting device comprising second interposing portions (the axial grooves 4 and 6) which are formed on the outer peripheral surface of the male shaft 1 and on the inner peripheral surface of the female shaft 2 and second torque transmitting members (the sliding members 8) which are formed on the second interposing portions (the axial grooves 4 and 6) and are slid upon a relative movement in the axial direction of the male shaft 1 and the female shaft 2 and to transmit torque at rotation thereof.

In the telescopic shaft having such a structure as described above, since the spherical members 7 are interposed between the male shaft 1 and the female shaft 2 and the spherical members 7 are preloaded by the leaf springs 9 to the extent that no backlash is generated with respect to the female shaft 2, it is possible to securely prevent backlash between the male shaft 1 and the female shaft 2 at the time of non-transmission of torque. At the same time, the male shaft 1 and the female shaft 2 can slide with a stable sliding load with no backlash when they are moved in the axial direction relatively to each other.

At the time of transmission of torque, the leaf springs 9 are elastically deformed to restrain the spherical members 7 in the circumferential direction, and the three columnar members 8 interposed between the male shaft 1 and the female shaft 2 mainly perform the function of transmitting torque.

For example, when torque is inputted from the male shaft 1, since preload of the leaf spring 9 is applied in the initial stage, there is generated no backlash and the reaction force against the torque is generated by the leaf spring 9, thereby transmitting the torque. In this case, the torque transmission as a whole is performed in a state that the transmitted torque and the inputted torque between the male shaft 1, the leaf springs 9, the spherical members 7 and the female shaft 2 are in balance.

When the torque is further increased, a gap between the male shaft 1 and the female shaft 2 through the columnar members 8 in the direction of rotation disappears so that the columnar members 8 transmits an incremental portion of the torque subsequent thereto through the male shaft 1 and the female shaft 2. For this reason, it is possible to securely prevent backlash in the direction of rotation between the male shaft 1 and the female shaft 2 so as to transmit the torque in a state of high rigidity.

From the above description, according to the present embodiment, since the columnar members 8 are provided in addition to the spherical members 7, almost all of the load amount can be supported by the columnar members 8 when a great amount of torque is inputted. As a result, it is possible to suppress an increase of the contact pressure between the axial grooves 5 of the female shaft 2 and the spherical members 7 so as to improve the durability of the shaft. At the same time, when a torque load is great, it is possible to transmit the torque in a state of high rigidity.

Moreover, since the columnar members 8 are in contact with the male shaft 1 and the female shaft 2, it is possible to reduce the torsional torque toward the spherical members 7 and to suppress sideway slide of the leaf springs 9. As a result, it is possible to prevent the hysteresis from being excessively great.

As described above, according to the present embodiment, it is possible to realize a stable sliding load and, at the same time, to securely prevent backlash in the direction of rotation, thereby transmitting the torque in a state of high rigidity.

Note that the spherical members 7 are preferably balls of rigid bodies. It is also preferable that the columnar members 8 of rigid bodies are needle rollers.

Since the columnar member (hereinafter called the needle roller) 8 receives a load thereof with a line contact, there can be obtained various advantages including that the contact pressure can be lowered, compared with the case with a ball which receives a load with a point contact. As a result, this arrangement is superior in the following points to a case in which all of the rows are in ball rolling structure.

- The attenuating performance in the sliding portion is great, compared with that in the ball rolling structure. As a result, the vibration absorbing performance is high.
- Since the needle roller is slightly in contact with the male shaft and the female shaft, a fluctuation in sliding load can be kept low, and a vibration due to this fluctuation is not transmitted to the steering.
- If the same amount of torque is to be transmitted, the contact pressure can be kept lower in the needle roller structure. As a result, the length in the axial direction can be reduced so that the space can be used effectively.
- If the same amount of torque is to be transmitted, the contact pressure can be kept lower in the needle roller structure. As a result, an additional process for hardening the surfaces of the axial grooves of the female shaft by thermal treatment or the like is no longer required.
- The number of the constituent parts can be reduced.
- The assembling performance can be improved.
- The assembling cost can be reduced.

As described above, the needle rollers play the essential role for torque transmission between the male shaft 1 and the female shaft 2 and, at the same time, are brought into sliding contact with the inner peripheral surface of the female shaft 2. This structure is superior in the use of the needle rollers in an intermediate shaft joint to the conventional structure which employs spline fitting in the following respects.

- The needle rollers are manufactured in mass production, and can be manufactured at very low cost.
- The needle rollers are polished after being subjected to the thermal treatment, so that they have high surface hardness and excellent abrasion fastness.
- Since the needle rollers have been polished, they have fine surface roughness and a low coefficient of friction in a sliding movement. As a result, the sliding load can be kept low.
- Since the length or the layout of the needle rollers can be changed in accordance with the condition of use, the needle rollers can be used in various applications without a change of the design concept.
- There is a case in which the coefficient of friction in a sliding movement is required to be further lowered, depending on the condition of use. In such a case, the sliding characteristics can be changed by subjecting only the needle rollers to the surface treatment. As a result, the needle rollers can cope with various applications without a change of the design concept.
- Since the needle rollers having different outer diameters by several microns can be manufactured at low cost, the gap among the male shaft, the needle rollers, and the female shaft can be minimized by selecting a diameter of the needle rollers. As a result, the rigidity of the shaft in the torsional direction can be improved easily.

Next, as shown in FIG. 2, all of such problems as described below can be solved.

Figure 10:
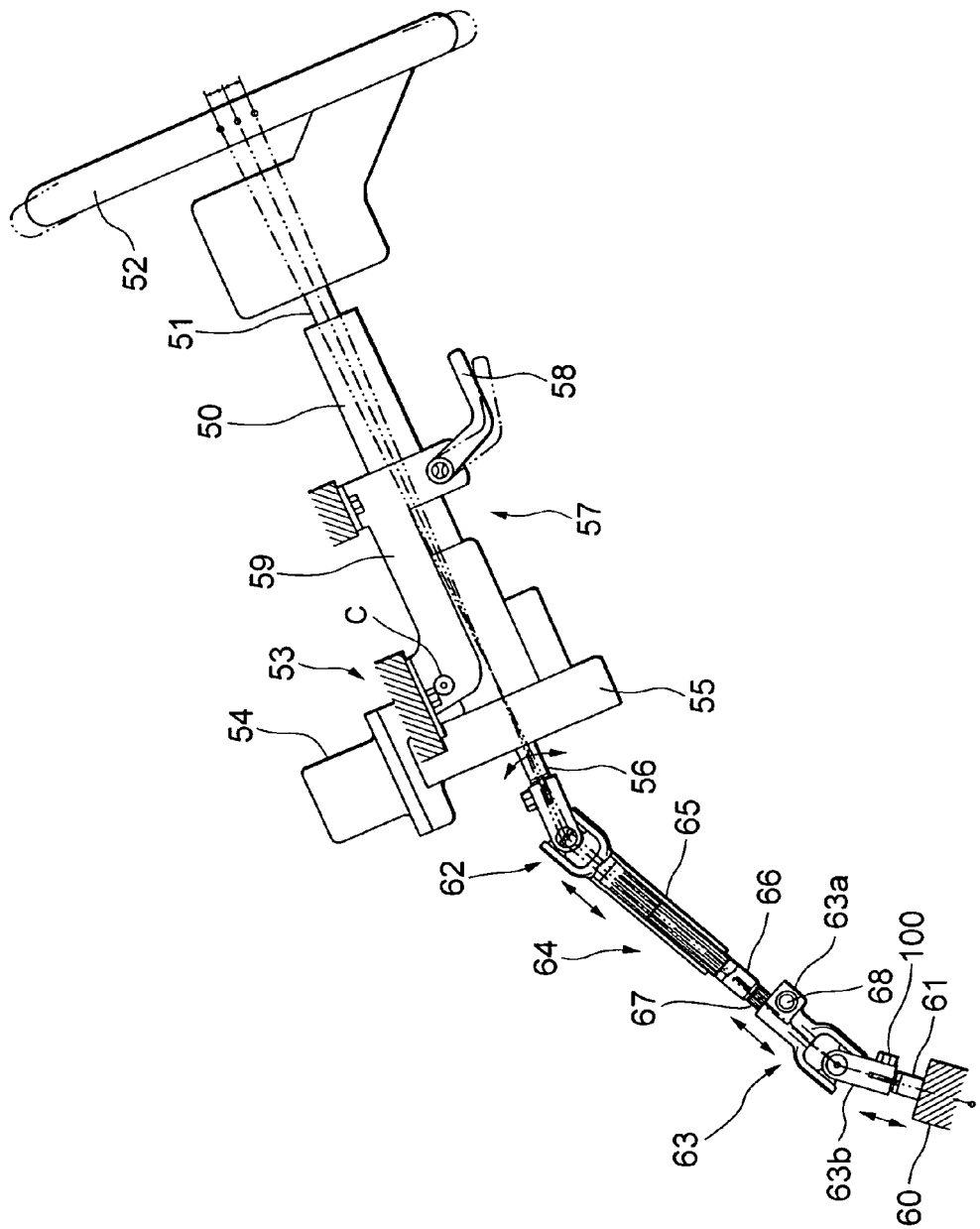
FIG. 10 is a schematic view of the steering apparatus for a vehicle according to the prior art, for showing the highest level and the lowest level of tilting (a view for explaining various axial displacements)
Figure 11:
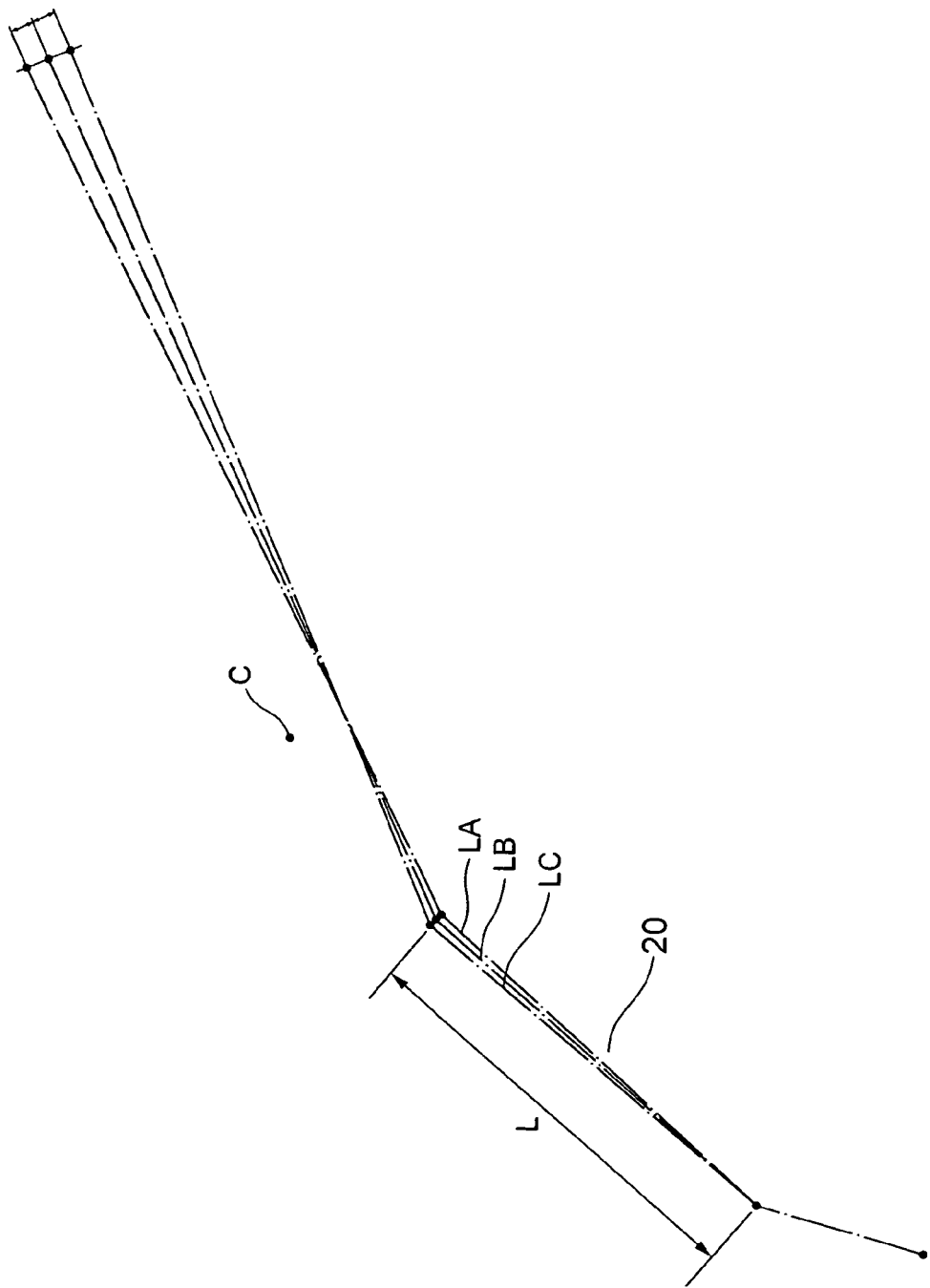
FIG. 11 is a view for explaining that an inter-joint length is changed at a tilt adjustment.
Figure 12:
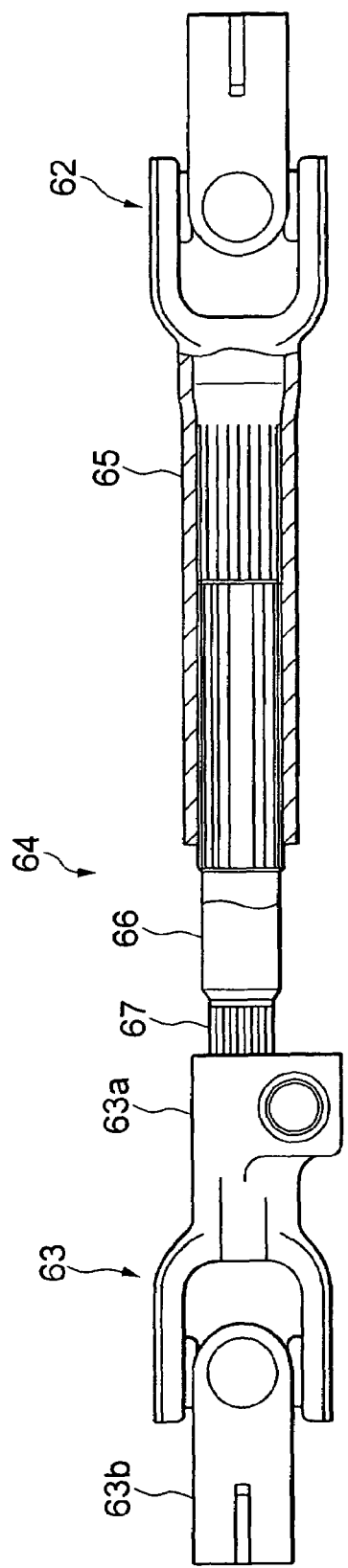
FIG. 12 is a partially cut-away cross sectional view of the intermediate shaft according to the prior art.

- A vibration is generated from the vehicle body (on the gear unit side) at running in the steering gear unit 60. However, in the present embodiment, since the telescopic shaft 20 can be easily extended and contracted owing to a low sliding load, the vibration from the vehicle body (on the gear side) can be fully absorbed.
- At assembling into the vehicle, conventionally as shown in FIG. 10, the yoke 63a of the lower-side universal joint 63 is slid with respect to the male serration unit 67 so that the yoke 63b of the lower-side universal joint 63 is brought into fitting with the pinion shaft 61, to be finally clamped by the clamping bolt 68. However, in case of the present embodiment, a yoke of the universal joint 22 and the male shaft 1 are formed as a unitary structure so that the telescopic shaft 20 can be extended and contracted more easily with a low sliding load. As a result, the assembling work can be performed easily, the assembling performance can be improved, and the manufacturing cost can be reduced. Also, with this arrangement, it is no longer required to perform a clamping work of the clamping bolt 68.
- Also, according to the prior art as shown in FIG. 10, an axial load is generated due to a movement of the upper-side universal joint caused by tilt adjustment between the upper-side universal joint 62 and the lower-side universal joint 63. However, in the present embodiment, since the telescopic shaft 20 can be extended and contract more easily with a low sliding load, such an axial load is not generated.
- Further, according to the prior art shown in FIG. 10, when torque transmission is performed in a state that a position of installation of the column-assist type electric power steering apparatus 53 is deviated from the designed value, the torque is slightly fluctuated with respect to the designed value. However, in the present embodiment, since the telescopic shaft 20 can be extended and contract more easily with a low sliding load, the torque is not fluctuated greatly with respect to the designed value.

From the above description, it is possible to fully satisfy the following requisitions which are required for a case in which the intermediate shaft is combined with the column-assist type electric power steering apparatus.

- At steering, a low stable steering shaft rotating torque property which is not affected by a deviated position of installation in the vehicle is to be obtained.
- At running of the vehicle, the intermediate shaft 20 is to absorb a vibration and a displacement from the steering gear unit 60 so as to make it difficult to transmit unpleasant vibration or sound onto the steering wheel 52.
- At tilt adjustment, the intermediate shaft 20 is to easily absorb an axial displacement when the steering wheel 52 is tilted in an up-and-down direction and the length of the intermediate shaft 20 is changed so as to prevent an extra axial load or moment from being applied on the whole steering shaft 52.
- At assembling, the intermediate shaft is to be extended and contracted freely so as to be easily assembled in the vehicle, whereby one clamping position in the clamping work of the clamping bolt 68 can be omitted.
- The intermediate shaft is required to have the structure which can endure high torque transmission for transmitting high torque constantly.

No backlash is to be generated in the direction of rotation so that the assist control on the steering torque can be performed more correctly.

The intermediate shaft is required to have a collapsing mechanism for absorbing a displacement from the front part of the vehicle at a collision in order to protect the driver.

The intermediate shaft is to be extended and contracted easily at a tilt operation so that it is possible to obtain an optimal position for the driver and to obtain a stable steering property.

Second Embodiment

Figure 6:
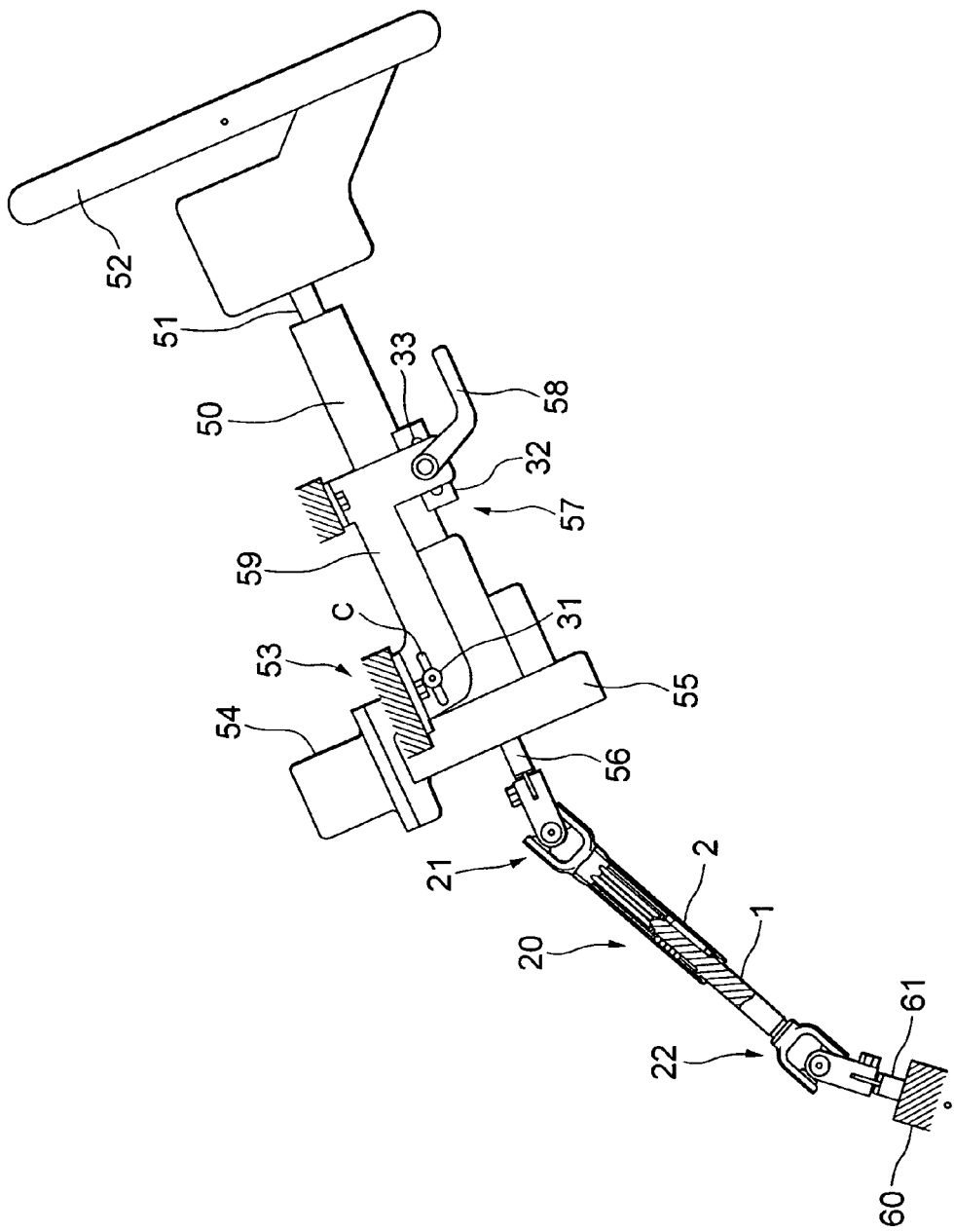
FIG. 6 is a schematic view of a steering apparatus for a vehicle according to a second embodiment of the present invention.
Figure 7:
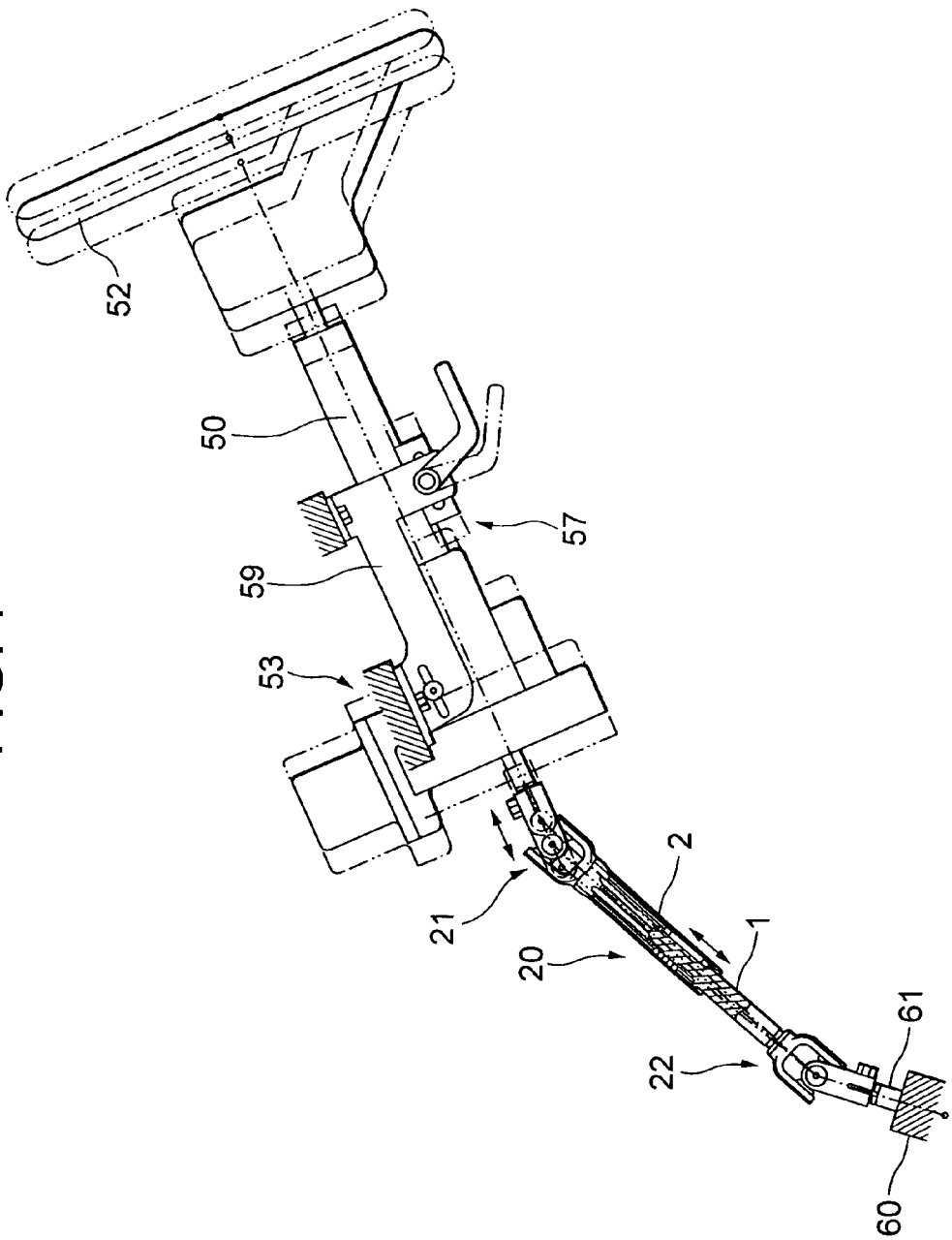
FIG. 7 is a schematic view of the steering apparatus for a vehicle shown in FIG. 6, for showing a state that it is telescopically sliding.
Figure 8:
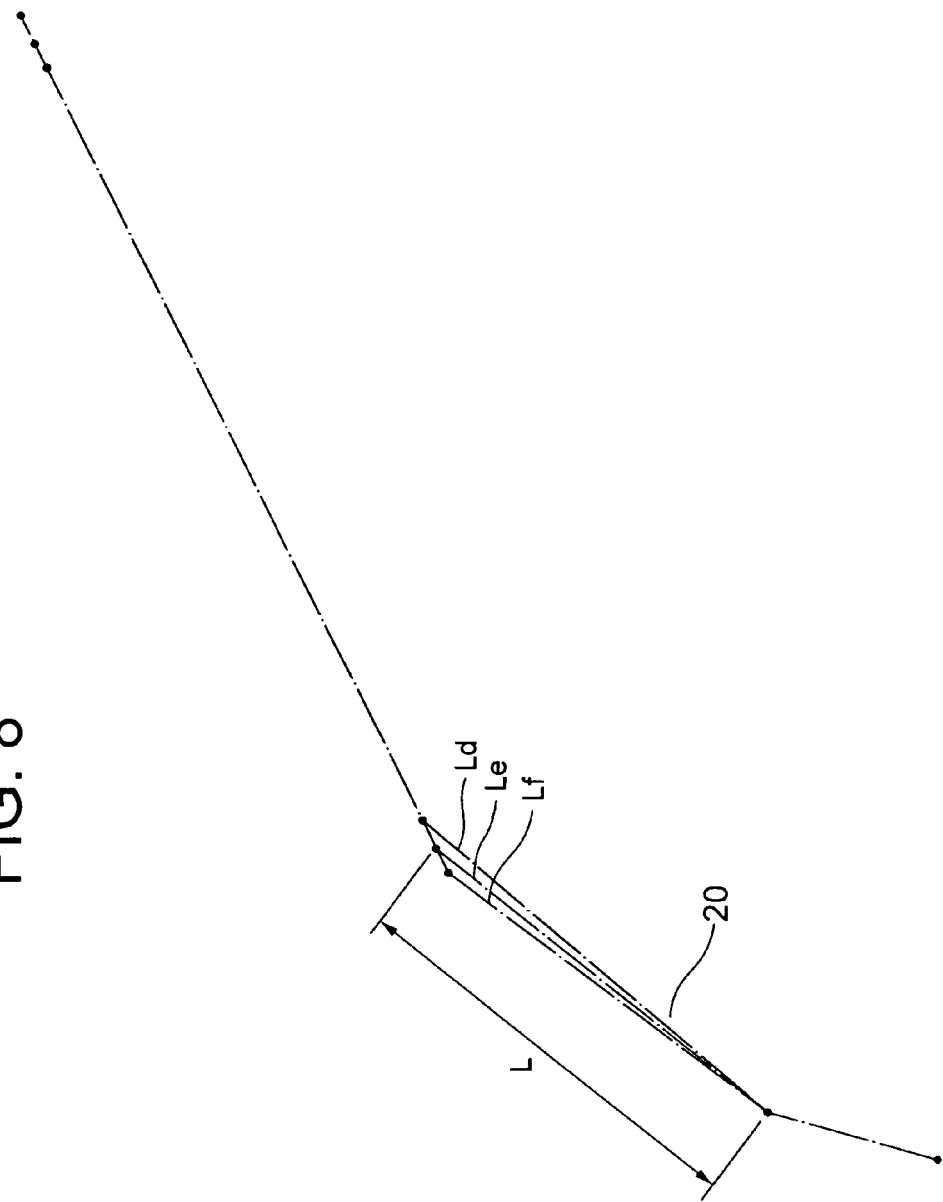
FIG. 8 is a view for showing the center line of FIG. 7 only, in a state that the intermediate shaft is extended and contracted by a telescopic slide.
Figure 9:
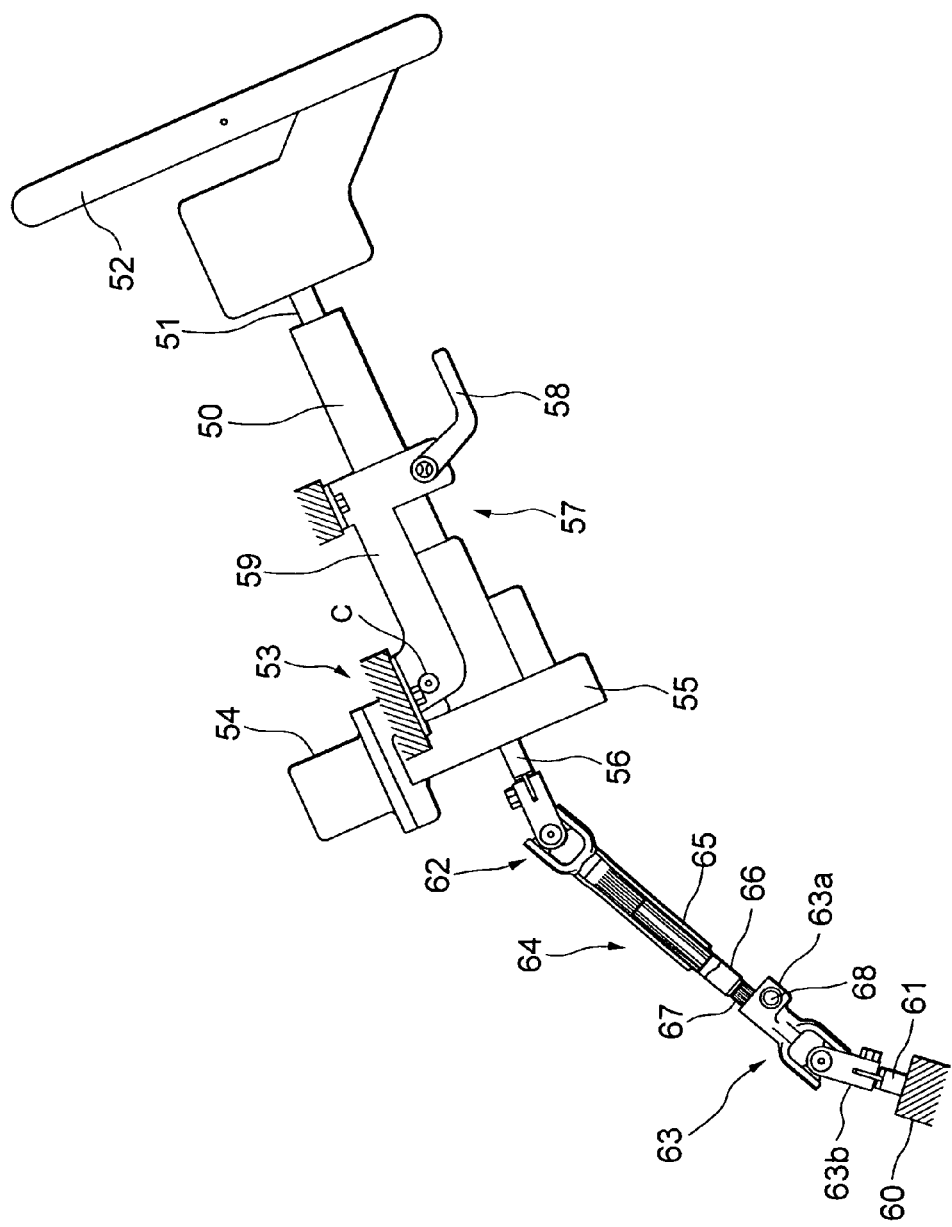
FIG. 9 is a schematic view of a steering apparatus for a vehicle according to the prior art.

FIG. 6 is a schematic view of a steering apparatus for a vehicle according to the second embodiment of the present invention. FIG. 7 is a schematic view of the steering apparatus for a vehicle shown in FIG. 6, for showing a state that it is telescopically sliding. FIG. 8 is a view only for showing the center line of FIG. 7, in a state that an intermediate shaft is extended and contracted by the telescopic sliding.

The second embodiment has a column structure which is provided with a telescopic function, in addition to a tilt function, so that the whole steering column 50 can move in the axial direction. In such a case, the intermediate shaft 20 is required to be extended and contracted freely.

As shown in FIG. 6, an elongated hole 31 for telescopic operation is formed on a bracket 59 which is fixed to the vehicle body side, and another elongated hole 33 for telescopic operation is formed on a distance bracket 32 which is provided on the steering column 50.

As shown in FIG. 7, the position of the upper-side universal joint 21 is changed owing to telescopic adjustment. In this case, however, the intermediate shaft 20 can absorb an axial displacement easily so that an extra axial load or moment is not applied on the whole steering shaft.

As shown in FIG. 8, the relation that Lf<Le<Ld is established when the inter-joint length (L) is Ld at the maximum telescopic position, Le at a telescopic intermediate position, and Lf at the minimum telescopic position.

As seen from the above description, also in the second embodiment, it is possible to fully satisfy the following requisitions which are required for a case in which the intermediate shaft is combined with the column-assist type electric power steering apparatus.

At steering, a low stable steering shaft rotating torque property which is not affected by a deviated position of installation in the vehicle is to be obtained.

At running of the vehicle, the intermediate shaft 20 is to absorb a vibration and a displacement from the steering gear unit 60 so as to make it difficult to transmit unpleasant vibration or sound onto the steering wheel 52.

At telescopic adjustment, the intermediate shaft 20 is to easily absorb an axial displacement when the steering wheel 52 is telescopically slid and the length of the intermediate shaft 20 is changed so as to prevent an extra axial load or moment from being applied on the whole steering shaft 52.

At assembling, the intermediate shaft is to be extended and contracted freely so as to be easily assembled in the vehicle, whereby one clamping position in the clamping work of the clamping bolt 68 can be omitted.

The intermediate shaft is required to have the structure which can endure high torque transmission for transmitting high torque constantly.

No backlash is to be generated in the direction of rotation so that the assist control on the steering torque can be performed more correctly.

The intermediate shaft is required to have a collapsing mechanism for absorbing a displacement from the front part of the vehicle at a collision in order to protect the driver.

The intermediate shaft is to be extended and contracted easily at a telescopic operation so that it is possible to obtain an optimal position for the driver and to obtain a stable steering property.

Note that the present invention is not limited to the embodiments described above, but can be altered in various manners.

As described above, according to the present invention, it is possible to realize a stable sliding load and, at the same time, to prevent backlash without fail to transmit torque in a state of high rigidity.

The invention claimed is:

1. A steering apparatus for a vehicle, in which steering power of a steering shaft is assisted by a column-assist type electric power steering apparatus so that the steering power is transmitted to steer wheels of the vehicle by a steering mechanism, comprising:

a telescopic shaft with a male shaft and a female shaft fitted to each other to be capable of transmitting torque therebetween and moving in an axial direction relative to each other, said telescopic shaft being interposed between an output shaft of said column-assist type electric power steering apparatus and an input shaft of the steering mechanism, said telescopic shaft being provided with:

a first torque transmitting device including
first interposing portions which are formed on an outer peripheral surface of the male shaft and an inner peripheral surface of the female shaft,
first torque transmitting members which are disposed in the first interposing portions and are rotated upon relative movement of the male shaft and the female shaft in the axial direction, and
elastic members which are disposed in the first interposing portions adjacent to the first torque transmitting members so as to restrain the first torque transmitting members during torque transmission between the male and female shafts and to apply preload to the male shaft and the female shaft through the first torque transmitting members when no torque is transmitted between the male and female shafts; and a second torque transmitting device including
second interposing portions which are formed on the outer peripheral surface of the male shaft and on the inner peripheral surface of the female shaft, and
second torque transmitting members constituted by discrete columnar bodies which are disposed in the second interposing portions, which slide upon relative movement of the male shaft and the female shaft in the axial direction, and which transmit torque during torque transmission between the male and female shafts.

2. The steering apparatus according to claim 1, wherein
the first interposing portions include at least one pair of axially extending grooves formed on an outer peripheral surface of the male shaft and an inner peripheral surface of the female shaft, and
the first torque transmitting members include a plurality of spherical members disposed in the at least one pair of axially extending grooves.

3. The steering apparatus according to claim 1, wherein
the second interposing portions include at least one pair of axially extending grooves formed on an outer peripheral surface of the male shaft and an inner peripheral surface of the female shaft, and
at least one of the columnar bodies is disposed in the at least one pair of axially extending grooves.

4. The steering apparatus according to claim 1, wherein the second torque transmitting members are arranged so as not to transmit torque until at least one of the elastic members has sufficiently deformed such that the second torque transmitting members come into direct torque-transmitting contact with both the male and female shafts.

5. The steering apparatus according to claim 1, wherein
each first interposing portion includes a pair of first axially extending grooves formed on an outer peripheral surface of the male shaft and an inner peripheral surface of the female shaft, and
each second interposing portion includes a pair of second axially extending grooves formed on an outer peripheral surface of the male shaft and an inner peripheral surface of the female shaft.

6. The steering apparatus according to claim 5, wherein the pair of first axially extending grooves includes a groove constituted by a pair of inclined flat-shape side surfaces and a flat bottom surface formed between the side surfaces, and a groove constituted by an arch-shaped or Gothic arch-shaped surface.

7. The steering apparatus according to claim 5, wherein each groove of the pair of second axially extending grooves is constituted by an arch-shaped or Gothic arch-shaped surface.

8. A steering apparatus for a vehicle, in which steering power of a steering shaft is assisted by a column-assist type electric power steering apparatus so that the steering power is transmitted to steer wheels of the vehicle by a steering mechanism, comprising:
a telescopic shaft with a male shaft and a female shaft fitted to each other to be capable of transmitting torque therebetween and moving in an axial direction relative to each other, said telescopic shaft being interposed between an output shaft of said column-assist type electric power steering apparatus and an input shaft of the steering mechanism, said telescopic shaft being provided with:
a first torque transmitting portion including
a first pair of axially extending grooves which are respectively formed on an outer peripheral surface of the male shaft and an inner peripheral surface of the female shaft,
a first torque transmitting member which is received in the first pair of axially extending grooves and is rotated upon relative movement of the male shaft and the female shaft in the axial direction, and
an elastic member which is disposed in one of the first pair of axially extending grooves so as to elastically support the first torque transmitting member; and
a second torque transmitting portion including a second pair of axially extending grooves which are respectively formed on the outer peripheral surface of the male shaft and on the inner peripheral surface of the female shaft, and
a discrete columnar body which is received in the second pair of axially extending grooves and which slides upon relative movement of the male shaft and the female shaft in the axial direction,
wherein the second torque transmitting portion is constructed so as not to transmit torque in a first range of torque transmitted between the male and female shafts and to become effective to transmit torque in a second range of torque transmitted between the male and female shafts, the second range of torque being higher than the first range of torque.

9. The steering apparatus according to claim 8, wherein the elastic member is disposed so as to restrain the first torque transmitting member during torque transmission between the male and female shafts and to apply preload to the male and female shafts through the first torque transmitting member when no torque is transmitted between the male and female shafts.

10. The steering apparatus according to claim 8, wherein the first torque transmitting member is a spherical member.

11. The steering apparatus according to claim 8, wherein the first pair of axially extending grooves includes a groove constituted by a pair of inclined flat-shape side surfaces and a flat bottom surface formed between the side surfaces, and a groove of constituted by an arch-shaped or Gothic arch-shaped surface.

12. The steering apparatus according to claim 8, wherein each groove of the second pair of axially extending grooves is constituted by an arch-shaped or Gothic arch-shaped surface.

* * * * *